(12) United States Patent
Shearer et al.

(10) Patent No.: US 12,250,327 B2
(45) Date of Patent: **\*Mar. 11, 2025**

(54) SYSTEMS AND METHODS FOR DIGITAL CERTIFICATE SECURITY

(71) Applicant: VELLITAS LLC, Buffalo, WY (US)

(72) Inventors: Seth Martin Shearer, Buffalo, WY (US); Spencer Vernon Shearer, Buffalo, WY (US)

(73) Assignee: VELLITAS LLC, Buffalo, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,229

(22) Filed: Oct. 20, 2023

(65) Prior Publication Data

US 2024/0089121 A1 Mar. 14, 2024

Related U.S. Application Data

(63) Continuation of application No. 17/900,750, filed on Aug. 31, 2022, now Pat. No. 11,831,785, which is a continuation of application No. 16/942,651, filed on Jul. 29, 2020, now Pat. No. 11,444,786, which is a
(Continued)

(51) Int. Cl.
| | |
|---|---|
| *H04L 9/32* | (2006.01) |
| *G06F 16/951* | (2019.01) |
| *G06F 21/45* | (2013.01) |
| *G06F 21/57* | (2013.01) |

(52) U.S. Cl.
CPC .......... *H04L 9/3263* (2013.01); *G06F 16/951* (2019.01); *G06F 21/45* (2013.01); *G06F 21/577* (2013.01); *G06F 2221/2101* (2013.01); *H04L 2209/64* (2013.01)

(58) Field of Classification Search
CPC . H04L 9/3263; H04L 2209/64; G06F 16/951; G06F 21/45; G06F 21/577; G06F 2221/2101
See application file for complete search history.

(56) References Cited

U.S. PATENT DOCUMENTS

| | | | |
|---|---|---|---|
| 8,499,150 B1 * | 7/2013 | Nachenberg | H04L 9/3268 713/176 |
| 8,719,908 B1 * | 5/2014 | Boniface | H04L 63/0823 726/10 |
| 9,338,012 B1 * | 5/2016 | Naik | H04L 9/3247 |

(Continued)

*Primary Examiner* — Darshan I Dhruv

(74) *Attorney, Agent, or Firm* — Thorpe North & Western, LLP

(57) ABSTRACT

Embodiments describe systems and methods for analyzing digital certificates. A computer-implemented method can include identifying a plurality of digital certificates, individual digital certificates of the plurality of digital certificates including respective internal information. External information associated with the individual digital certificates can be determined, the external information not contained within the respective digital certificate. The external information can be updated in a database with additional external information that is collected on a periodic basis. A query can be run against the database to identify one or more vulnerable digital certificates associated with a client based on the internal information and the external information. A notification can be sent to the client regarding the one or more vulnerable digital certificates.

20 Claims, 10 Drawing Sheets

Related U.S. Application Data continuation of application No. 15/184,997, filed on Jun. 16, 2016, now Pat. No. 10,771,260.

(60) Provisional application No. 62/180,479, filed on Jun. 16, 2015.

(56) References Cited

U.S. PATENT DOCUMENTS

| | | | |
|---|---|---|---|
| 9,374,244 B1* | 6/2016 | Brandwine | H04L 21/00 |
| 9,692,640 B1* | 6/2017 | Veladanda | H04L 41/0803 |
| 9,742,758 B1* | 8/2017 | Sharifi Mehr | H04L 63/0823 |
| 2006/0095923 A1* | 5/2006 | Novack | G06Q 20/0855 |
| | | | 719/318 |
| 2009/0070290 A1* | 3/2009 | Nye | G06F 21/64 |
| 2013/0013918 A1 | 1/2013 | Brown et al. | |
| 2013/0117558 A1 | 5/2013 | Metke et al. | |
| 2014/0095866 A1* | 4/2014 | Grebennikov | H04L 9/3268 |
| | | | 713/156 |
| 2014/0283054 A1* | 9/2014 | Janjua | H04L 63/1408 |
| | | | 726/23 |
| 2014/0344937 A1* | 11/2014 | Sabin | H04L 63/1433 |
| | | | 726/25 |
| 2015/0256345 A1* | 9/2015 | Vaid | H04L 9/3268 |
| | | | 713/158 |
| 2015/0271171 A1* | 9/2015 | Rakshit | H04L 63/0823 |
| | | | 726/10 |
| 2015/0341353 A1* | 11/2015 | Zhou | H04L 9/3239 |
| | | | 713/175 |
| 2016/0173286 A1* | 6/2016 | Gallagher | H04L 9/321 |
| | | | 713/156 |
| 2016/0277193 A1* | 9/2016 | Sabin | H04L 9/321 |

* cited by examiner

Certificate Information
  Certificate Version = 3
  Certificate Serial Number = 4b4c1d7465ab7ec7
  Certificate Signature Algorithm = sha1
  Certificate Subject = C = US, ST = New York, O = Some Company Inc., Ou = IT Security, CN = www.somecompany.com
  Company Name (found in certificate) = SomeCompany Inc.
  Company Department (found in certificate) = SomeCompany IT Security
  Reverse DNS Name of Certificate Host = www.somecompany.com
  Key Algorithm = encryption
  Key Strength = 2048
  CA Key Identifier = 240AECDC89
  Certificate Key Identifier = 6800F6100
  Identified as a Root Certificate = CAFAS3SC
  Domain Name = www.somecompany.com
  IP Address = 10.1.10.3003
  Subject Alternative Name(s) =
    Certificate DNS Name = www.somecompany.com
    Certificate DNS Name = mail.somecompany.com
    Certificate DNS Name = crm.somecompany.com
Certificate Authority Information
  Certificate Issuer = O = Cybertrust Inc. CN = Cybertrust Public SureServer SV CA
  Issuing CA = Cybertrust
  Identified CA = Cybertrust Inc.
Validity Periods
  Date Certificate Enters Service = 2015-02-02T21:06:17Z
  Date Certificate Expires = 2016-02-02T23:06:37Z
  Date of Certificate Validity = 2015-02-02 2016-02-02
  Total Certificate Validity Period (in days) = 365
Certificate Usage
  Key Usage:
    Certificate Key Usage = Digital Signature
    Certificate Key Usage = Key Encipherment
  Certificate Extended Key Usage:
    Certificate Key Usage = TLS Web Server Authentication
    Certificate Key Usage = TLS Web Client Authentication
  Netscape Legacy Certificate Type = SSL Client, SSL Server Geospatial Location
  Certificate Identified Location = New York, US
  Validated Certificate Longitude = 42.363596
  Validated Certificate Latitude = 31.083206

Certificate Validation
  Certificate Curation:
    Evaluated = 2015-02-04 Rick Anderson
    Evaluated = 2015-02-06 Jim Anderson
    Name of Curator = John Smith
    Title of Curator = Director, Security Operations
    Company Name = SomeCompany
    Curation Date = 2015-02-07
      Marked as Dangerous = FALSE
      Marked as Valid = TRUE
      White/Black Listed = white
      Geolocation has been validated = TRUE Server Configurations
  Server Encryption Type = TLSv1.0
  Cipher Type = TLS_ECDHE_RSA_WITH_RC4_128_SMA
  Server Compression Enabled (0 = false) = 0
  OCSP Stapling = false
  Secure Ticket Accepted = false
  Supports Secure Renegotiation = true
  Server Heartbeat Enabled = false

Figure 8

SYSTEMS AND METHODS FOR DIGITAL CERTIFICATE SECURITY

RELATED APPLICATIONS

The present application is a Continuation of U.S. patent application Ser. No. 17/900,750, filed on Aug. 31, 2022, which is incorporated herein by reference.

The U.S. patent application Ser. No. 17/900,750 was a Continuation of the then co-pending U.S. patent application Ser. No. 16/942,651, filed on Jul. 29, 2020, issued on Sep. 13, 2022 as U.S. Pat. No. 11,444,786, which is incorporated herein by reference.

The U.S. Pat. No. 11,444,786 was a Continuation of the then co-pending U.S. patent application Ser. No. 15/184,997, filed on Jun. 16, 2016, issued on Sep. 8, 2020 as U.S. Pat. No. 10,771,260, which is incorporated herein by reference.

The application Ser. No. 15/184,997 claims priority to and benefit of the then U.S. Provisional Patent Application No. 62/180,479 filed on Jun. 16, 2015, the disclosure of which was incorporated by reference in its entirety.

FIELD

Embodiments disclosed herein generally relate to computer security, and more particularly, to digital certificate security.

BACKGROUND

Digital certificates may include Secure Socket Layer (SSL) certificates, Transport Layer Security (TLS) certificates, and all digital certificates adhering to the X.509 standard, among others. Digital certificates have been used to encrypt data streams between computing systems since the early inception of the public internet. The use of digital certificates is intended to ensure that the data transferred between these systems is secure and safe from external eavesdropping and misuse. The use of certificates has increased dramatically as business and individuals embrace the internet as a way to transact business and share information.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 8 illustrates example data, including internal information and external information, that the system may determine for individual digital certificates, in accordance with various embodiments.

DETAILED DESCRIPTION

Figure 1:
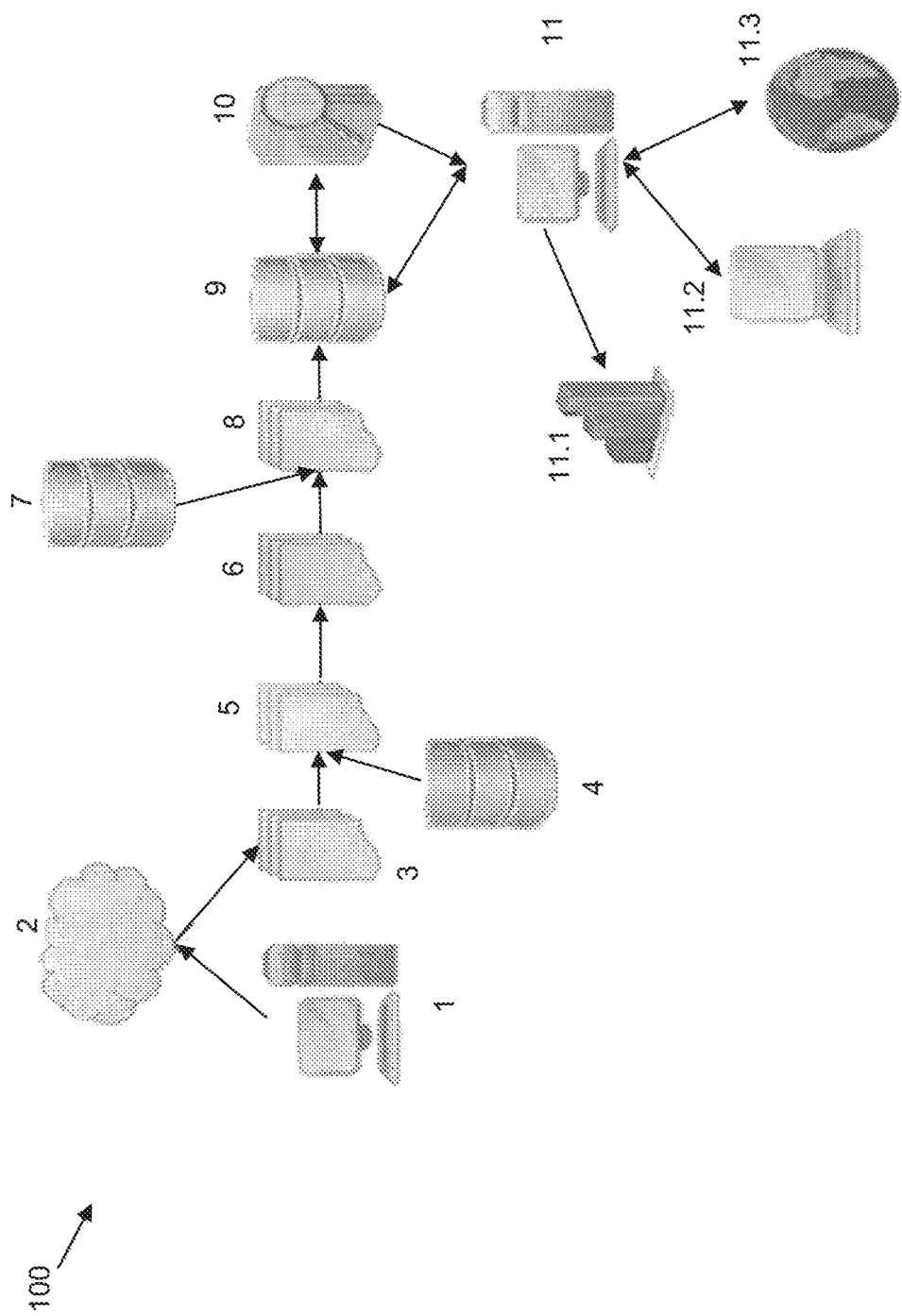
FIG. 1 is a flow diagram illustrating a process of data acquisition and data flow for acquiring and analyzing data associated with digital certificates, in accordance with various embodiments.

Disclosed herein are systems and methods for digital certificate security, the use of which may allow companies to safeguard their organization by looking at their corporate security assets from a global perspective. This unique perspective may enable prompt identification and correction of vulnerabilities and anomalies in various embodiments. When weaknesses are detected by the systems disclosed herein, information on or automatic correction of those flaws may be provided before an attacker can exploit them.

As noted above, the use of certificates has increased dramatically with the growth of the internet. However, malicious activities have simultaneously increased on the internet as a way to steal intellectual property, financial, and personal information, and to disrupt business and government. This problem has been present ever since certificates were introduced in the 1990s; however it has been exacerbated by the explosion in certificate usage over the last few years, estimated at 30% year over year growth.

The rapid expansion of certificate use within an organization has made it hard if not impossible for the organization to monitor and ensure the security of the critical encryption assets. This problem is compounded when products such as firewalls, spam filters, computing hardware and software automatically create "self-signed" certificates without an administrator's knowledge. The proliferation of, and the nearly "invisible" nature of certificates, has created an environment that allows data breaches to go undetected for many months. In particular, administrators typically simply install a certificate on a web server and trust that it will work and there will be no problems with the certificate. Certificates themselves generate no logs, they create no warnings for the administrator, and they do not provide diagnostics when there is a breach or outage. These issues make them nearly "invisible" to the administrator and to the web user alike. Expiration of the certificate may be the only time a certificate becomes visible (e.g., when a system ceases to work or a web browser provides a warning of an unsecured connection). Attackers are also adjusting their approach to take advantage of this disarray in the enterprise. Most organizations have thousands of certificates that they need to manage.

The existence of a certificate management problem often manifests itself in two ways. The first is data breaches. Malware, such as Stuxnet, Duqu, and Flame have been based on digital certificate weaknesses. These are some of the first and most well-known exploits which serve as templates for many of the attacks that are occurring today. Internet cyber-criminals have been taking advantage of these vulnerabilities and have been actively exploiting them for monetary gain, embarrassment, or to cripple organizations. The second is system outages. Many corporations become painfully aware of this problem when a system outage is experienced. Expired certificates prevent server to server communication and web browsers provide a security warning to end users if they visit a website with an expired certificate. Studies have shown that most users ignore the warning and click through to access the web site, a behavior that exposes the user, and corporate resources accessed by the user, to attack.

These problems are symptomatic of an organization's inability to properly control and manage its certificates. The challenges continue to compound as certificates are used for typical web traffic, email systems, Wi-Fi, Virtual Private Networks (VPN) and many other uses.

The conventional approach to addressing this problem is to record certificates in a spreadsheet or database. All too often, the collection of this information is fragmented and is not stored in a central repository or is passed on by word-of-mouth. There are innumerable failure points in this process, including the following:

Many automated systems (both hardware and software) will self-generate certificates upon installation and these are not reported upon or recorded since they are nearly invisible to the administrators.

With global organizations, there are too many people, groups and systems to ensure all data is appropriately recorded in a spreadsheet.

As people move within an organization or leave the organization, the knowledge they carry with them invariably leads to outages and other certificate-related data loss.

Not all systems hold certificates, making it difficult to isolate which systems need to be actively monitored for vulnerabilities relating to certificates.

Many administrators are asked to manage an organization's security infrastructure without adequate training or knowledge, and may make mistakes. These mistakes create vulnerabilities for an organization, and these vulnerabilities may be exploited by attackers.

Conventionally, an organization would need to manually check and verify certificates and the servers on which they reside, manually check systems for new vulnerabilities as they are discovered, continually stay abreast of new threats, and determine how to fortify their environment against those exposures.

The manual approach may be inadequate even for small organizations with limited certificates. For example, many of the recent data breaches have been caused by cyber-gangs spoofing certificates. There is no traditional protection from such malicious attacks as they do not rely on an organization forgetting to manage a certificate, but can be accomplished by a persistent attacker. Certificate spoofs occur when an attacking organization is either able to create a hash collision (for example, the famous MD5 collision that was created using a cluster of gaming systems), attack the server infrastructure and plant their own certificates, or create certificates through legitimate authorities which intrudes on an organization's naming conventions (discussed in further detail below).

Consequently, the manual approach to certificate management includes many failure points, including simple mistakes, lack of knowledge of industry security requirements, internal policy, any regulating governance, or even mistakes in the certificate installation process. Further, humans may purposely generate weak or out-of-compliance certificates to create a backdoor for themselves or others.

Companies that act as a Certificate Authority (CA) are in the business of issuing these digital certificates amidst a very competitive market. Some CAs provide software or services to monitor a company's network, cataloging the discovered certificates issued by all CAs with the objective of receiving certificate renewal revenue when a certificate is due for expiration. They send a renewal notice to the customer of the other CA and offer to renew the certificate, often at a discount, to capture certificate renewal revenue.

Some services purport to enable an organization to have its SSL certificates monitored on identified portions of the organization's internal network, inside the organization's firewall. If a portion of a network is missed, oftentimes because the administrator is unaware of the portion's existence, it will not be monitored by such a service. Such services also fail to provide a perspective on relevant certificate activity outside of an organization's network, as discussed in further detail below. This outside activity may be most relevant to security. For example, a certificate that used to be within an organization's network, but is now outside of an organization's network, may be a weak link. In another example, outside certificates that encroach on an organization's name (as discussed below), may also be a vulnerability. Finding such certificates may be important to preventing a data breach.

Traditional monitoring tools and techniques fail because they focus only on the known digital certificates that may be directly owned by an organization, a view that is too narrow to capture important vulnerabilities. In particular, the traditional approach of looking "inside-out" at security hasn't worked and attackers are taking advantage of this inertia. Attackers don't want an organization's security team to look at its environment the way they do, from an external view of the infrastructure.

Various ones of the systems and methods disclosed herein actively scan, index, and catalog all publicly available certificates, including capturing and aggregating information not previously recognized as relevant to digital certificate security. Publicly available and publicly visible certificates are certificates that are available outside the firewall of the customer organization. Additionally, or alternatively, the systems and methods described herein may be used with respect to certificates that are only available within the organization's firewall.

The systems and methods described herein may isolate weak spots in certificate usage, or analyze data to present human-understandable markers of weak spots in certificate usage. The systems and methods may identify anomalies on a world-wide basis, and provide analytics on an organization's overall security posture. For example, various embodiments disclosed herein may provide a "global" view of any intrusions on a company's naming conventions or encroachment on its domain presence. These encroachments are usually evidenced by certificates which have naming conventions which are aimed at confusing an end-user and masking their true intentions of masquerading as a legitimate organization. Examples are using character substitutions, inserting a 1 (one) instead of a l, or double n's (nn) in the place of an "m." When these substitutions are displayed in the font-limited browser address bar, they can be frequently overlooked and remain unnoticed; possibly deceiving a user into thinking they are interacting with a trusted site.

Some embodiments of the systems and methods disclosed herein identify vulnerabilities in the system hosting the certificate, a common attack vector of attackers as they create a man-in-the-middle, spoof, or other cyber-attack on areas not identified by traditional certificate monitoring. Some embodiments of the systems and methods disclosed herein may re-focus the scope of certificate monitoring to the entire internet, thereby providing an improved approach to detecting breaches.

Various ones of the embodiments disclosed herein utilize many previously unrecognized data points within the certificate environment that can be leveraged to provide a holistic approach to identifying threats and vulnerabilities. Security practitioners have conventionally looked at the certificate as though it contains all the data required to assess risk, without recognizing that there may be many additional factors that may make a system vulnerable. Additionally, the threat on certificates is an emerging threat that is evolving extremely quickly. Most organizations do not know how to, or simply are not able to react quickly enough to secure their global infrastructure. Since certificates can reside on thousands of systems across an enterprise and only one or two of those may be vulnerable, the isolation of the certificates and their systems which are at risk can be an insurmountable problem for the average enterprise.

The systems and methods disclosed herein may provide unique information and functionality that may reduce the threat of an attack. No one solution can prevent all attacks, since brute-force and luck are always a factor, but the chances of a successful attack are greatly reduced through proper certificate hygiene. The systems and methods disclosed herein may be used to identify and expose the very vulnerabilities attackers are looking to exploit before an attack occurs.

The systems and methods disclosed herein depart dramatically from conventional approaches, at least because the disclosed systems and methods do not rely exclusively on data contained within a certificate. Rather, the systems and methods include the utilization of extensive external data associated with the certificate (e.g., data about the certificate and/or the computing system that hosts the certificate). Various ones of the systems disclosed herein collect and/or store this complementary external data together with the internal data found in the certificate itself. Some of the data collected, stored, and/or analyzed by various embodiments includes:

The configuration of the server on which the certificate is installed. Since the server negotiates with a client for acceptable communication parameters, misconfiguration on the server may jeopardize the security of the certificate (e.g., allowing the server to "fall back" to less secure protocols if the user asserts that it requires an older (less secure) protocol). This may allow the server to communicate on Secure Socket Layer Version 3 (SSLV3) or other insecure protocols, which is a severe vulnerability to the organization.

A certificate is created with information on the company represented in the certificate to help assess the validity of the certificate and ensure that it belongs to the organization. This information is, in general, related to the corporate headquarters, not the datacenter or the location where the certificate is actually located. The system herein discussed, pinpoints the actual geolocation of the certificate being analyzed thereby helping determine if the certificate may be a falsified certificate purporting to be legitimate, but being hosted in a geolocation outside normal locations for the organization.

The Domain Name System (DNS) name of the host.

The actual Internet Protocol (IP) address of the host. Frequently, a certificate may be created using the host system's IP address. This certificate may then be deployed on many different systems, or the host IP address may be changed, thus leaving the IP address as defined in the certificate as invalid. Further, many "internal" certificates become exposed to the public internet. Those certificates may have internal IP addresses yet the server has a public IP address, thus leaving the IP addresses in conflict with each other.

The date and time the data was collected.

Detecting certificates that are not intended for production use (as discussed below).

Some embodiments of the systems disclosed herein include "back-end" systems for scanning the internet, harvesting data, manipulating that data into a usable format, and combining this data with other forms of information to enrich the systems with value-added details. Some embodiments of the systems disclosed herein include "front-end" systems for providing a user interface that enables the presentation of information to a user (e.g., a system administrator or security professional) and the receipt of commands from the user.

The following paragraphs identify a number of computing system components that may be included in the security systems disclosed herein, and whose operation may be described by the methods disclosed herein.

Internet Security Asset Catalog (ISAC)—If properly set up, certificates do a good job of encrypting data, however they are not able to protect themselves. The ISAC contains the required information needed to protect certificates and the environment in which they operate. Existing technologies simply do not have features that enable the functionality delivered by ISAC. The ISAC may take the form of a database or other organized data structure system stored on one or more computer readable media (e.g., non-transitory computer readable media, such as any conventional memory device) and/or computer readable instructions stored in a computer readable media such that, when the computer readable instructions are executed by one or more processing devices of a computing device, the computing device may perform any suitable ones of the operations described below using the data stored in the database or other data structure. The ISAC may include the following features designed to protect an organization from or remediate a security weakness or data breach:

1) Double Agent—This feature makes it possible to examine all certificates globally to determine if there are rogue certificates posing as legitimate certificates on hostile infrastructure. This type of opaque data breach allows businesses to operate as normal while sensitive information, such as intellectual property and financial data, is gathered by the attacker.

2) Early Detection and Treatment—This feature allows an organization to detect and remediate anomalies before they are discovered and used to compromise security. The anomalies may include, for example, differences in the internal information and/or external information associated with respective digital certificates associated with a client, and/or identifying external information that may pose a risk for the client (e.g., using a less-secure configuration of the host server that stores the digital certificate).

3) Outside-in View—This feature provides an "outsider" view of an organization's security assets, exposing both strengths and weakness that need to be fixed by an "insider". This approach stands in stark contrast to the industry "inside-out" approach to security. Because the vast majority of data breaches start from the outside, the "outside-in" approach exposes the vulnerabilities that an attack would exploit so they can be remediated. As new exploits are discovered the "outside-in" approach identifies organizations that are vulnerable to the new exploit.

4) Actual Location vs Assumed Location—This feature enables a query against all certificates finding every location where a single certificate has been deployed, often exposing locations that were previously unknown to an organization. This provides a mechanism to target active correction of a compromised certificate in all of its locations, or in the case of a catastrophic failure of a certificate authority, identification of all affected certificates that must be removed and replaced immediately.

5) Security Asset Geospatial Tagging—This feature tags all publicly available certificates within the ISAC with geospatial data allowing for rapid geospatial analysis. This provides a mechanism by which all certificates or a subset of those certificates belonging to an organization, to be plotted on a map. This helps identify compromised, forged, or otherwise anomalous certificates that may be masquerading as legitimate certificates in a country or region where the company is not expecting to find one of their certificates. Further, the system allows for geospatial queries to be passed to the system in an inclusionary form meaning, identifying all security certificates within a specific geographic boundary such as all security certificates located in North America. The geospatial boundary may be created by clicking on a map, issuing queries constrained by country or geospatial coordinates defined as latitude and longitude. The system also allows for a query to be passed to the system in an exclusionary form meaning, identifying all certificates that are NOT (or are excluded) contained within a specific geospatial boundary. For example, identifying all security certificates which contain certain traits such as company names or other identifiable information, but are NOT located within North America. These queries which may be passed to the system are used to immediately ascertain if certificates are suspicious or fraudulent or if they are found in geographic regions which are not expected.

6) Reverse DNS Tagging—This feature tags all certificates in the ISAC with "reverse DNS" data to further provide data for exposure of fraudulent certificates. This is another unique feature added to the external data stored in the database, enabling cross referencing data on these certificates to identify fraudulent certificate usage. A certificate that advertises it is for Company X, yet the RDNS data indicates the server belongs to Rogue Company Y, clearly indicates there is a problem. This is exposed through the addition of this data.

7) Company Name Encroachment—This unique feature uses the ISAC to expose domain and company name encroachment. This is an innovative leap forward in identifying malicious certificates feigning legitimacy and has become a favorite attack of the skilled, modern cyber-criminal. This feature may include search techniques to identify encroachment on corporate naming conventions which is a common attack by modern attackers. As noted above, name encroachment occurs when an attacker uses several methods for making their certificates appear legitimate to the unsuspecting user. Some of these are in the form of character substitution which is difficult to detect with the normal font usage on web browsers. For example, an attacker may create a certificate with the name valid.com instead of valid.com, hoping that the unsuspecting user will not notice the character substitution of the 1 in the place of the L in that name. Another attack may be to misspell a company name in a way that seems logical to the target audience. This may be done by adding hyphens or other punctuation to confuse a user. For example, creating a certificate with the name being micro. soft.com may be a completely valid certificate, but if they are trying to impersonate Microsoft, then it is a malicious use of and intrusion on the Microsoft naming conventions. Others may be to create long domain names such as, ebay.com.this-is-not-the-real-ebay.com. In this example, the user may see the first part of the name (i.e., ebay.com) and feel safe in proceeding to enter private data into that fraudulent website.

8) Certificate Creep—Frequently a non-production certificate is exposed to the public internet and self-identifies the fact that it is a non-production certificate. The ISAC may detect these certificates and mark them as vulnerable, exposing not just a non-production certificate but also a breach in normal infrastructure which should have prevented this from happening. The ISAC may identify a non-production certificate based on one or more markers associated with the certificate. For example, the markers may be textual markers contained within the certificate. Example textual markers that may be used include any of the following markers (including all derivations caused by capitalization and wildcard expansion) to identify a certificate as being a non-production certificate: beta, default, demo*, dev, devel*, do*not*use, dummy, eval*, internal, lab*, no*prod*, not*for*use, pre*prod*, qa, quality*, r*and*d, research*dev*, sample, sandbox, snake*oil, stag*ng, stage, stg, temp*, test*, trial, uat, user acce*test*. Some of the markers have wildcards in them to allow for derivations of a word/acronym to be found. Further, this list will capture items such as "unit testing" as the word "testing" is in that phrase, making the list shorter than if all possibilities were illustrated. It will be apparent that other markers may be used in some embodiments. Additionally, some embodiments may use a subset of the listed markers and/or variations of the listed markers.

Some embodiments may additionally or alternatively use one or more geographical markers to identify non-production certificates. For example, an organization may have its development servers in a first location and its production servers in a second (different) location. The ISAC may identify a non-production certificate based on a geographical marker that indicates the certificate is stored in the first location.

9) Global Certificate Identification—One of the features within the ISAC is the ability to search on not just a company name, but on unique identifiers within a certificate. This allows for the identification of all certificates within the global certificate environment, detecting possible stolen certificates, and the ability to find where a single certificate has been installed in many locations. This also allows deep inspection of all certificates to identify where all certificates are located that were generated with the same key material from either the company or the CA/issuer. This is useful information to remediate a catastrophic failure of a CA breach, or compromise of private keys. Some example queries include, but are not limited to: a) Show all certificates where the actual certificate location is not equal to the expected certificate location; b) Show all unique certificates that appear in multiple locations that are outside of the selected production, test or QA locations; c) Show all production certificate locations given specific CA markers that were issued on a given date or date range; and d) Show all certificates that are hosted in an environment that has known or given weakness (e.g., server configuration, handshake information, or other internal or external information that is associated with a weakness) and the location is outside of the designated production location.

FIG. 1 is a flow diagram illustrating a process 100 of data acquisition and data flow, in accordance with some embodiments. The operations of FIG. 1 may be discussed as performed by "the system," which may be a computing system including conventional processing, data storage, network interface, and display capabilities that are specially configured to perform the operations discussed herein and to manage data and displays as discussed herein.

At 1 of the process 100, the system initiates a scan of the entire internet.

At 2 of the process 100, this scan queries each IP address on the internet (e.g., IPv4 address space) determining if it will accept a secure (e.g., SSL/TLS handshake) connection. If a secure connection is refused or is otherwise unavailable, the system will disregard that IP address on this particular scan, but will re-query it again on the next scan interval. This scan may be performed on any desired schedule (e.g., weekly) and the time it takes may depend on the available computing resources. For example, this scan may be sped-up as desired by increasing the number of scan nodes to collect the data more rapidly. This process may yield approximately 65 Million records that are then processed through the remainder of the system.

At 3 of the process 100, all data and metadata that can be received during the communication is recorded and saved in a database for processing in the system. The data and metadata may include internal information that is found in the certificate and external information that is associated with the certificate but not directly found in the certificate. For example, a single data record for a digital certificate may be entered into the database on operation 3 with one or more data components, such as: details of the TLS handshake (such as details on the server configuration for the SSL/TLS handshake protocol; specifics on the cipher suite that can be used for the data exchange; details on how the certificate is secured through the communication between the user and the server, including the use of compression, if Online Certificate Status Protocol (OCSP) checking is enabled, if secure renegotiation is used, and if a heartbeat (heartbeat denotes if the server allows a "keep-alive" heartbeat to occur instead of requiring a renegotiation) is used within the connection; and other details on contemporary vulnerabilities (such as "heartbleed" and other attack mechanisms that are collected for use within the system). The data components may also include an actual IP address of the host on which the certificate resides. The data components may also include data on the server configuration to which the secure connection is being made. The data components may also include a receipt of the 64-bit encoded security certificate (e.g., X.509 certificate). The data components may also include the "certificate chain" if available.

At 4 of the process 100, this initial data is then aggregated in the system for additional processing.

At 5 of the process 100, the data that is collected in operation 3 is then enriched with additional external data, such as geospatial data. This geospatial data (e.g., latitude and longitude, textual representation of the country, state, region, city and other physical address locations, or any other suitable encoding) corresponds to the IP address of the host on which the certificate is located. This data is a "snapshot in time" detailing how many certificates were found on a specific date, where they were located, how many belong to each organization, and their relative health (security). An integral component of this data which is not native to the certificate data is the location on the globe where that certificate is found and the date on which it was collected. This data cannot be adjusted as it would obscure the geolocation of the certificate at a specific point in time. To achieve this, the geospatial data may be aggregated with the certificate data as it is processed within the system. Accordingly, the geospatial data from prior scans may be kept in the database when new geospatial data is added. This ensures that even as IP addresses are reassigned to new geographic locations, the system will know where a certificate was located on the globe and for what duration it was in that location. This bitemporal view of the data (reflecting the understanding of what we knew and the date on which we knew that item, and how that data changes with the passage of time) is important in understanding the migration of an organization's certificates over time and across the globe.

A certificate contains static Country, State, and Locale data which is generally used to store the corporate address and not the location where the certificate is installed. The certificate may be tagged in the ISAC with the geospatial data derived from the location of the IP address. If the certificate moves, the tags are updated as of the time that movement of that certificate is detected. Retrieving geospatial certificate data from the ISAC is very fast, enabling real-time mapping of the locations of thousands of certificates. This is achieved due to the pre-computed geospatial data that had been aggregated together with the certificate data.

Further, as that data has been aggregated with the certificate data, it is much more accurate as to the geolocation than if it were performed at a later time when geolocations for the certificate may have changed. Without using the ISAC, mapping would be slower (since the geolocation would have to be ascertained by looking-up the geolocation as it relates to the IP address of the host machine at query time) and less complete (as it would not allow for a query to be initiated by a geographic location (e.g., "show me all certificates that are found in San Diego, California, regardless of the company that owns the certificate")). This approach provides for the first time, internet-wide geospatial analysis on the dispersion of certificates isolating countries or regions that are particularly at risk to certain types of attacks and organizations that may have strengths in one country/region and weaknesses in other countries/regions.

At 6 of the process 100, the 64-bit encoded certificate data is then decoded, making it human readable. This operation may be required to enable users to find relevant certificates, for the system to analyze the entire data set for aggregated information, etc.

At 7 of the process 100, when the data reaches this step, additional enrichment may take place to augment the already rich data with one or more additional data points, such as reverse DNS (rDNS) information, banner grab data, Alexa rankings, and other external information. Having rDNS data enables additional fact checking to determine if a certificate is a possible threat. While rDNS could be retrieved at runtime, response time would degrade if an rDNS call had to be requested for potentially thousands of certificates upon issuance of a query to the system.

At 8 of the process 100, all data is then verified to be correct and is human readable. Additional steps such as parsing the data to identify company names, certificate authorities, test and other non-production certificates may occur in this phase.

At 9 of the process 100, all of this data (combination of internal information and external information gathered in operation 3 and then enriched, decoded, and manipulated) is inserted into the ISAC. The ISAC may be a database. The ISAC allows for read/writes to the data so that information can be updated as information is adjusted (a certificate at a particular IP address is changed) or deleted (a certificate on an IP address is removed completely).

At 10 of the process 100, for speed of query execution, the ISAC is then indexed by a search engine that allows users to execute ad-hoc queries against the data set. An example of such a search engine may be SOLR (Apache Software Foundation). The purpose of this is to allow users to search for the criteria they require and see only those certificates that satisfy the components of the query instead of all certificates, or all of their company's certificates.

At 11 of the process 100, the system may have several user interfaces and modes of interacting with the system. The system may run one or more queries against the ISAC based on the internal information and the external information. For example, the system may run a client-specific query against the ISAC to identify one or more vulnerable digital certificates associated with a client based on the internal information and the external information, to identify differences and/or trends in the internal information and/or external information associated with the digital certificates associated with the client, and/or other queries. The queries may be run automatically by the system (e.g., periodically) or at the request/direction of a user. The results of the one or more queries may be displayed to a user of the system.

For example, the system may generate a published report (indicated as 11.1). This report may be sent to the company on a periodic basis containing a reporting of the certificates that have been found on the internet that contain their company name or are distinguished from the general certificate population in general by company identifying characteristics (e.g., IP address ranges, subsidiaries, trademark names, etc.). The report may detail some of the identified risks on their certificate population and suggest steps to correct these risk factors.

Figure 2:
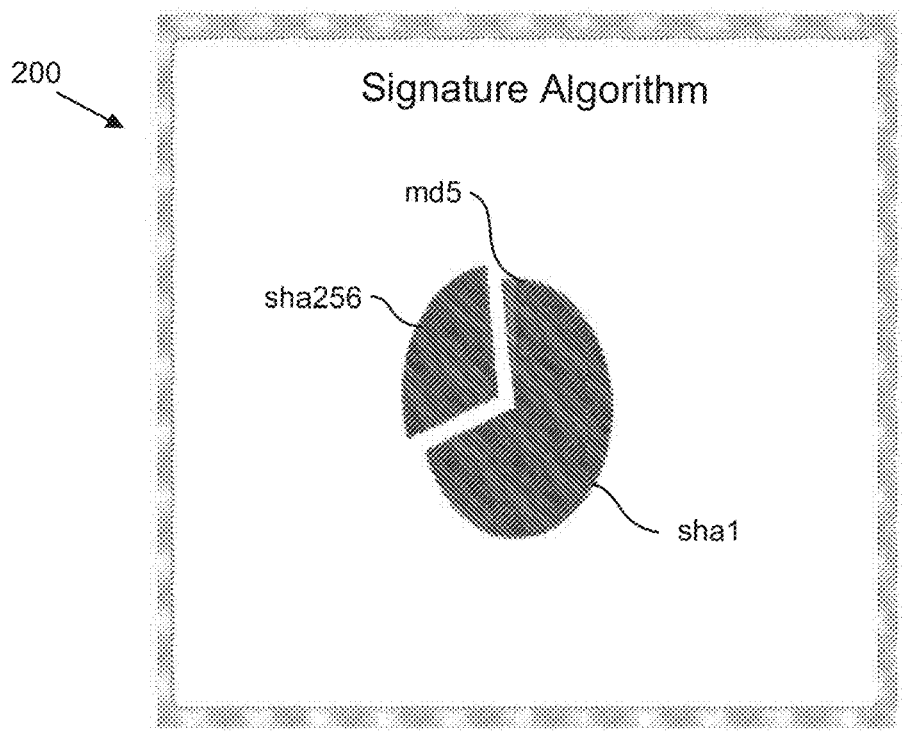
FIG. 2 is a pie chart showing the percentage of an organization's digital certificates that are signed by a particular signature algorithm, in accordance with various embodiments.

In various embodiments, the system may generate and/or display graphs and/or other visual representations to quickly identify general certificate hygiene practices and identify areas of concern (e.g., to identify one or more vulnerable digital certificates). For example, FIG. 2 is a pie chart 200 showing the percentages of an organization's certificates signed by a particular signature algorithm. The signing algorithm is one of the ways an attacker could use to try to compromise a certificate. For example, the MD5 algorithm was deprecated many years ago and is not recommended for use on any contemporary system. SHA1 is now also outdated. Thus, a pie chart like pie chart 200 that shows that only 25% of certificates are utilizing acceptable signature algorithms provides important information to an administrator.

Figure 3:
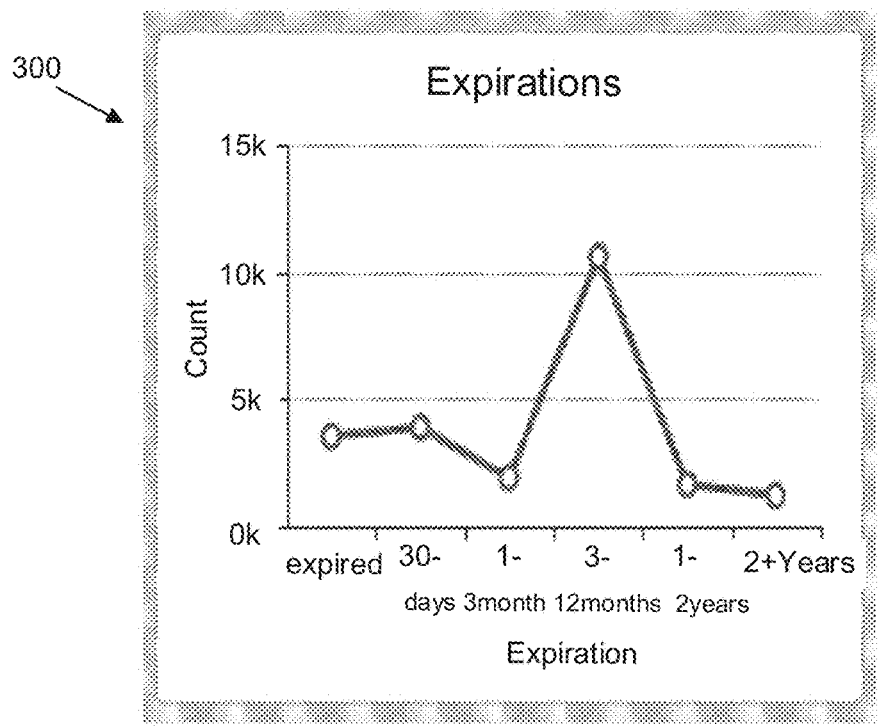
FIG. 3 is a graph illustrating the amount of time until expiration of digital certificates associated with a client, in accordance with various embodiments.
Figure 4:
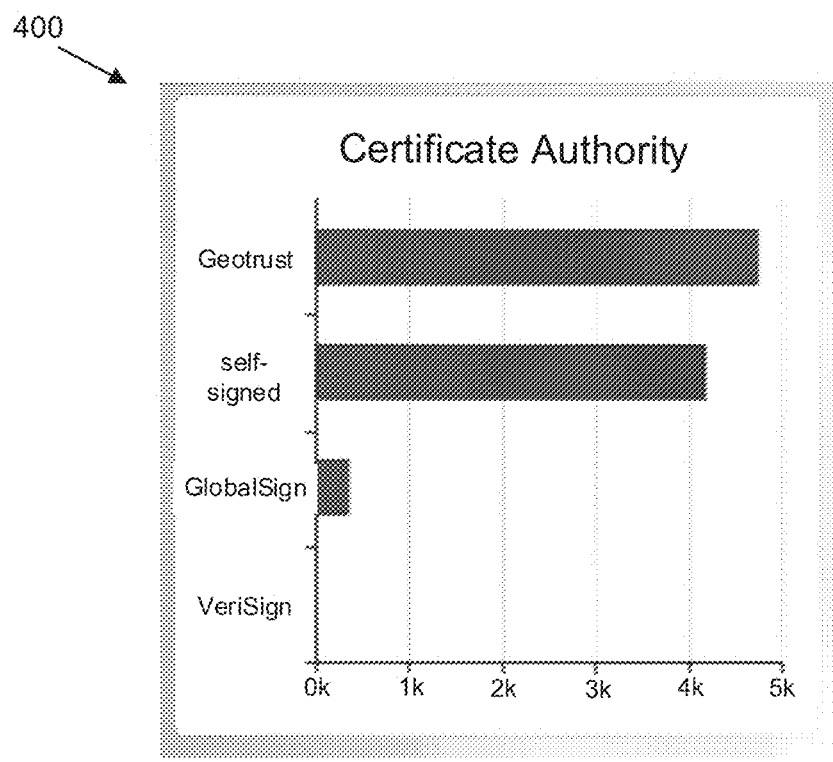
FIG. 4 is a bar graph that shows the origin of the digital certificates associated with a client, in accordance with various embodiments.

FIG. 3 is a graph 300 to illustrate the amount of time until expiration of digital certificates for the set of digital certificates associated with the client. FIG. 4 is a bar graph 400 that shows the origin of the digital certificates associated with the client (e.g., the CA that issued the certificates and/or whether the digital certificates were self-signed).

Referring again to FIG. 1, the user interfaces and modes provided by the system may also include an interactive portal where users are able to look at the specifics of all reported certificates for their company (indicated as 11.2 in FIG. 1). In some embodiments, a user's view may be limited to only certificates reported for their company, rather than all public-facing certificates for all organizations, so as not to unduly risk the security of other organizations. The user may use the interactive portal to interact with those certificates, including but not limited to marking certificates as valid or as dangerous, making notations on those certificates and setting warning for their organization on when to be notified on vulnerabilities or risks. These modifications are written back into the system and recorded for future reference. Further, this interface may provide historical data on organizational performance over time in reducing the risk of attack over time. These measures are based on the number of certificates which have been found over time, how many of those are in or out of company defined compliance and other risk factors as defined by the company.

In some embodiments, the system may receive expected information that indicates expected values for one or more fields of the internal information and/or external information for digital certificates associated with a client, and may compare the expected values to the internal information and/or external information that was determined for the digital certificates associated with the client (e.g., as stored in the database). For example, the system may be provided with one or more company policies. The system may identify certificates that are exceptions to the company policies. The identified certificates may be flagged as vulnerable certificates and the certificates and/or associated information may be sent to the company for inspection. The company policies may include, for example, the total duration of time a certificate should be available, the hashing algorithm used, approved third party certificate authorities, and/or certificate key strength.

Figure 5:
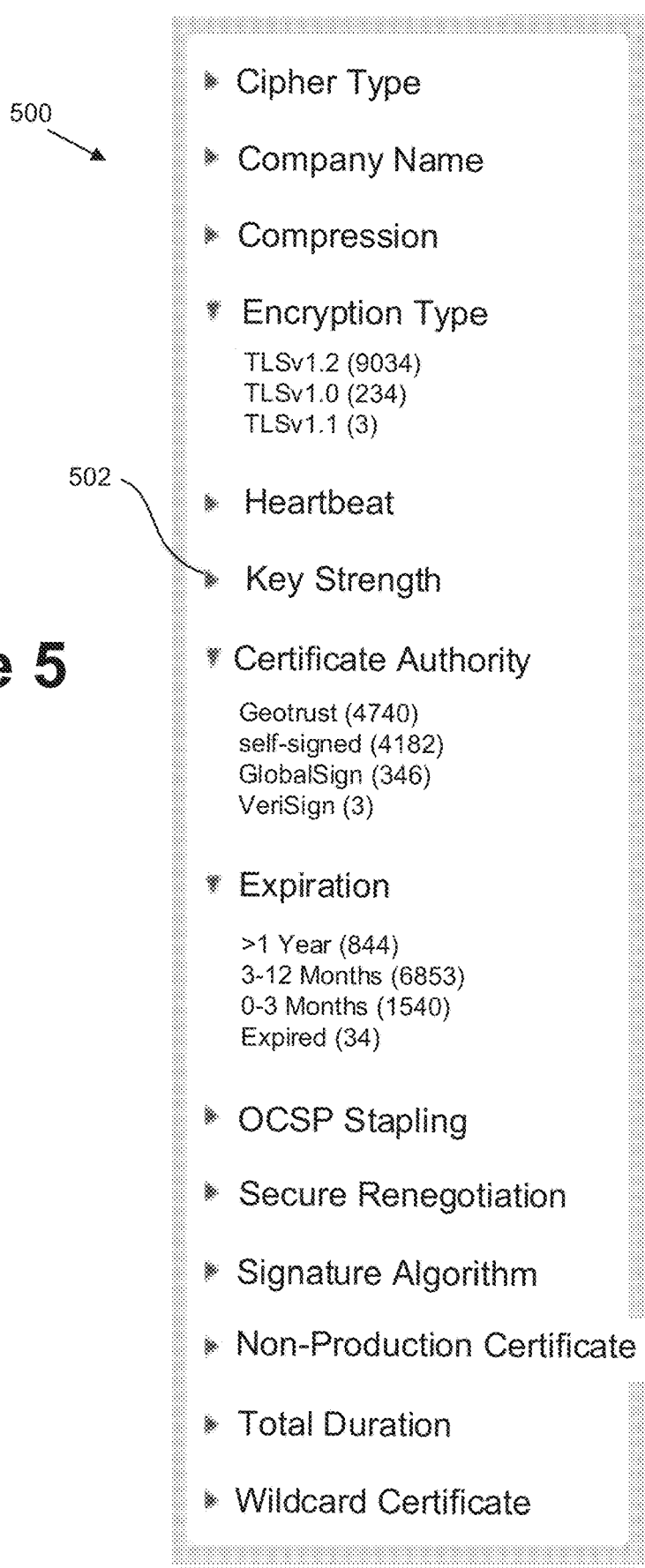
FIG. 5 illustrates a navigation bar that enables a user to filter query results by one or more categories, in accordance with various embodiments.

FIG. 5 shows a navigation bar 500 that allows users to filter their results by various categories 502. The categories 502 may include one or more of:

Cipher Type—this is the full cryptographic cipher suite used on the server hosting the certificate. The following is an example of an entry in the Cipher Type: TLS_RSA_WITH_AES_128_CBC_SHA.

Company Name—this denotes the name of the company as defined within the certificate. This provides insight into the naming conventions that may be in use for an organization, and may provide clues into lack of compliance to corporate standards, or on the malicious impersonation of a company name by an attacker. An example set of entries may be: Company ABC, Inc.: Company ABC, Incorporated; Company Alpha Bravo Charlie, Inc.; Companyabc.com; mail.companyabc.com, etc.

Compression—this indicates if the server hosting the certificate allows compression to be used. This is a known attack vector and it is recommended to disable compression. If compression is detected on any servers, this is important security information.

Encryption Type—denotes the encryption protocol used in the communication between client and server. Examples of the Encryption Type may include SSL v3; TLS v1.0; and TLS v1.2.

Heartbeat—denotes if the server allows a "keep-alive" heartbeat to occur instead of requiring a renegotiation.

Key Strength—exposes the strength (e.g., length) of the key used within the certificate. Current recommendations suggest keys of at least 2048-bits to be used.

Certificate Authority—lists the various issuing certificate authorities in use at an organization. This provides a quick mechanism for determining if policies are being followed, and anomalies may indicate a breach in compliance, or more malicious activities by an attacker.

Expiration—provides a date measure until a certificate will expire (or denote the number of certificates which have already expired). Most critical may be certificates which will expire within the next 90-days as they need to be in the queue to be replaced to avoid any downtime and subsequent reputational risk by having systems fail.

OCSP Stapling—reports on those systems which allow the certificate holder to "staple" a validation status to the certificate in the certificate transaction. This provides an extra form of certificate validation.

Secure Renegotiation—is a process wherein a long session between a client and a server may be quickly renegotiated without having to completely negotiate an entirely new session. When this is used in conjunction with early version of standard encryption protocols, this can lead to security vulnerabilities.

Signature Algorithm—defines the algorithm used to sign the certificate which is one of the most visible measures of the overall security of that certificate.

Non-Production Certificate—illuminates certificates which were not designed to be on production hardware and exposed to the many attacks prevalent on the internet.

Total Duration—calculates the total validity period of a certificate. When a certificate is created, it has a date on which it becomes effective (a start date) and a date on which it expires. These two dates form the total duration for which the certificate is valid.

Wildcard Certificate—these certificates generally have the form of *.yourcompanyname.com. These can be particularly dangerous if stolen or compromised as they can be used in many attacks on that organization.

Referring again to FIG. 1, the user interfaces and modes provided by the system may additionally or alternatively include a geographic view (indicated as 11.3). The system may generate and/or display a map to indicate the physical location of digital certificates associated with the client. This interface may allow a user to see the geographic dispersion of certificates over the globe. This enables a company to search not just by keywords, but also to search by geographic region. They are also able to whitelist (approve) or blacklist (deny) certificates that may be found in a specific geographic region. The action of blacklisting a certificate based on geography may initiate a workflow within the system as described in the actions section of this document. Further, these actions will have the effect of ensuring that rogue certificates are eliminated and revoked through CA Certificate Revocation Lists (CRL). Due to the system interacting with the CRL's, browsers will then recognize these rogue certificates as being a security threat and show them as invalid to the user.

To quickly determine on a geographic basis if certificates should be whitelisted or blacklisted, the system may provide a function known as "geo-fencing." In some embodiments, the system may provide "inclusive" geo-fencing. This indicates that everything within a specific geographic boundary is "safe". Everything that is found outside of the boundary is automatically marked as a risk. The boundary can be drawn through mouse clicks on a map and can be as large or as small as specified by the user. This will be most useful for a company that is regional in nature or only has operations in a relatively constrained area, so the inclusive area is denoting their safe zone.

Additionally, or alternatively, the system may provide "exclusive" geofencing, which means that a user may draw a boundary around a specific region and any digital certificates found in that region are defined to be a risk. Everything else (e.g., all digital certificates found outside the region) is accepted as valid. This is an approach that is particularly useful for a large multinational organization where they have operations in many regions/countries, but they want to mark a specific region or country as a risk. All geographic regions are inherently safe except the one that has been denoted on the map by the user.

The ISAC may also identify and present certificates that exhibit "name encroachment," e.g., when the certificate includes a name that is substantially similar to the name of the customer organization. The certificates with a name encroachment violation may be identified, for example, by using "fuzzy" searching and character substitution, in accordance with known techniques. This will help identify when an attacking organization is attempting to create a certificate that will be part of a man-in-the-middle or a spoof of the organization in an attempt to steal data, IP, credentials, or other digital material that may cause substantial damage to the company. In some embodiments, the ISAC may present the certificates that are marked as including a name encroachment violation to the organization, and may recommend and/or execute one or more actions, as discussed elsewhere herein, based on the name encroachment violation. Additionally, the system may filter the map view to show only those certificates that have one or more violations or a certain type of violation such as a name encroachment violation.

Figure 6:
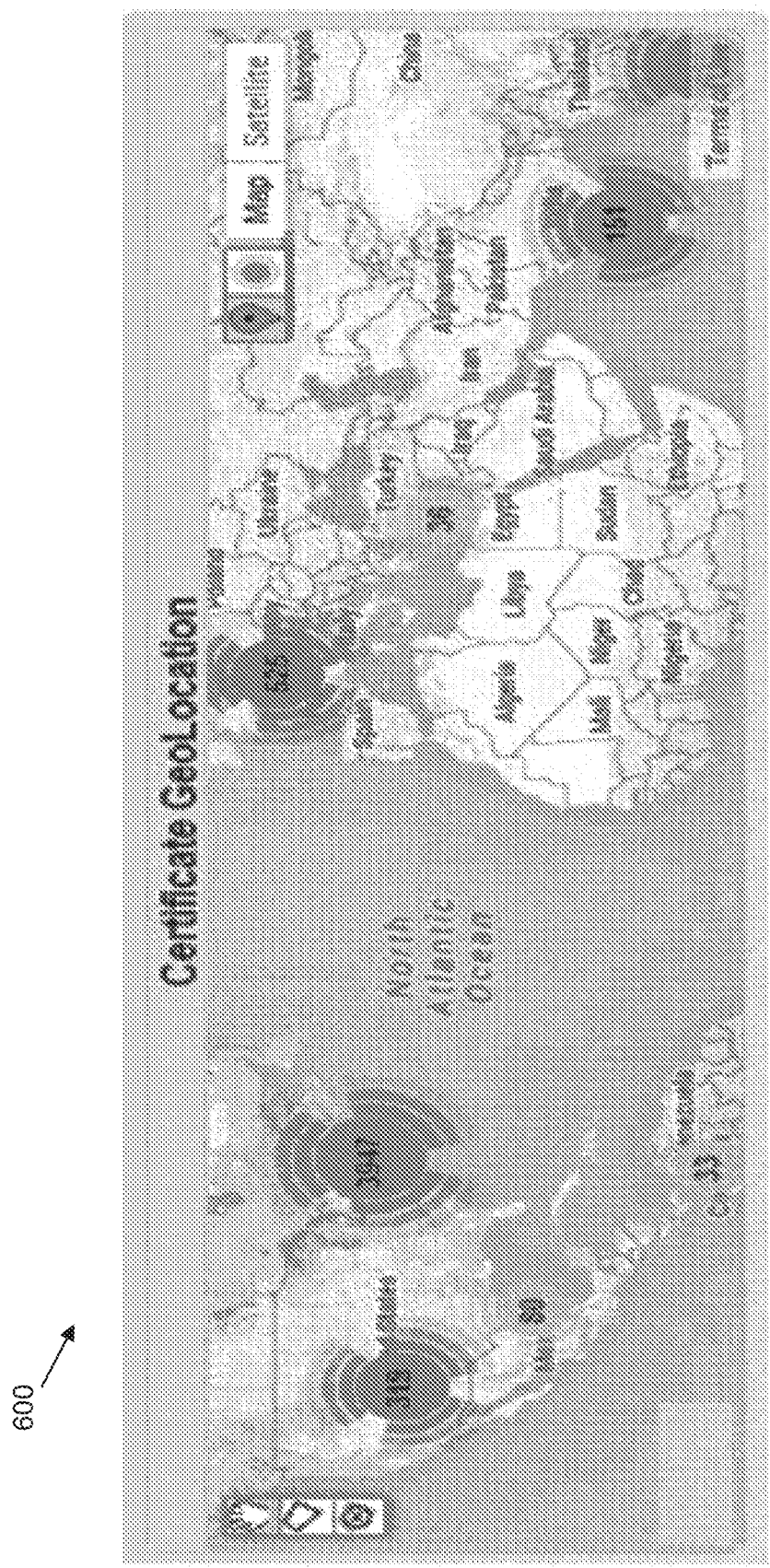
FIG. 6 shows a map that may be generated and/or displayed by the system to indicate the geographic locations of digital certificates associated with a client, in accordance with various embodiments.
Figure 7:
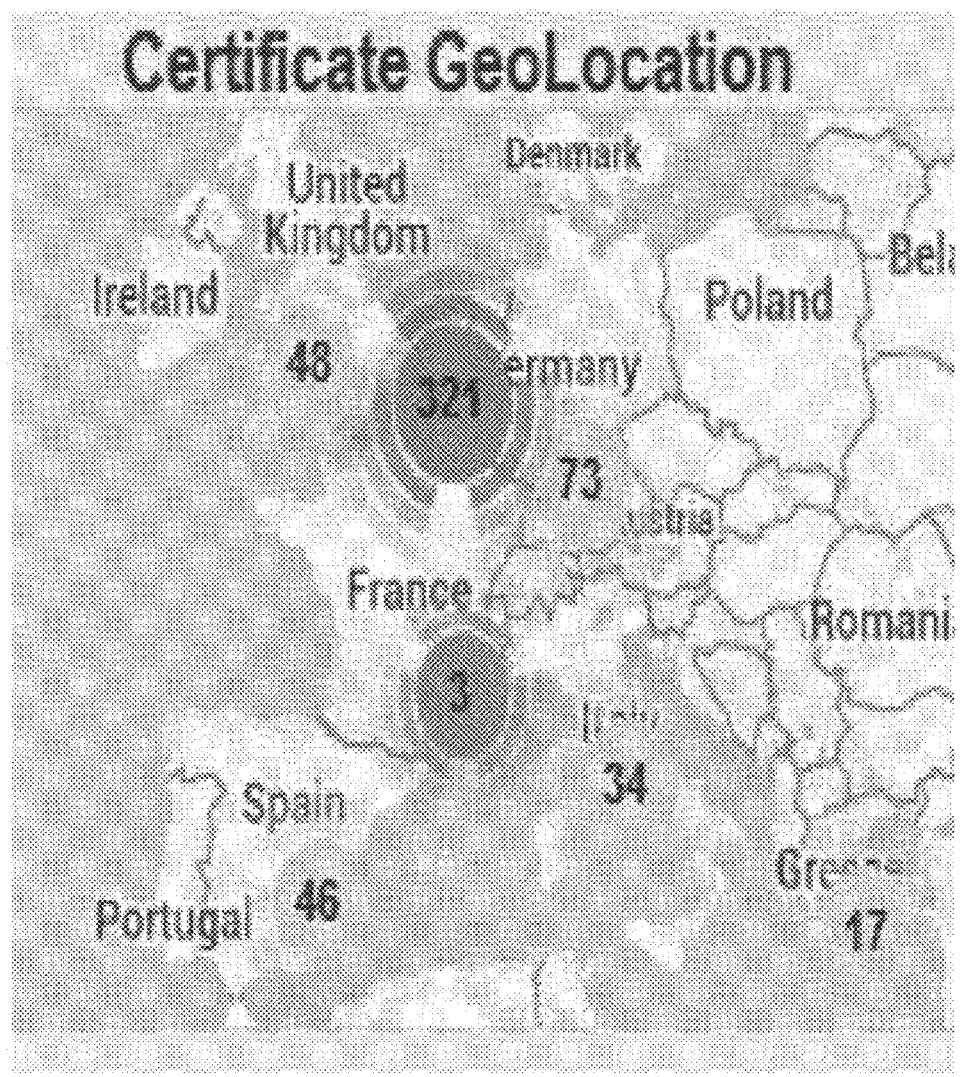
FIG. 7 shows another map that shows a close up view of a region of the map of FIG. 6 and shows more detailed information on the location of the digital certificates in the region, in accordance with various embodiments.

FIG. 6 shows a map 600 that may be generated and/or displayed by the system in accordance with various embodiments. The map 600 shows the geographic locations of the digital certificates associated with the client. The user may zoom into a region of the map, and the location of the digital certificates within the region may be presented in more detail. For example, FIG. 7 illustrates a map 700 that shows more detailed information on the location of the digital certificates in the European region.

In various embodiments, certificates identified by the system (e.g., as violating one or more rules or exceptions) may be marked with one or more actions and in turn trigger workflow processes to initiate to approve corrective actions. In some embodiments, the system may present the identified vulnerable certificates and information regarding one or more violations associated with the individual identified vulnerable certificates to the user. The user may select from the available actions. The system may receive the user's selection and execute the action with respect to the corresponding certificate. In other embodiments, the system may automatically mark certificates for a particular action based on the type of violation or other data.

The available actions may include any suitable actions. For example, the available actions may include one or more of a "Hide" action, "Ignore" action, "No Action" option, "Reassign" action, "Urgent Action" action, and/or "Fix" action. All the above noted actions (as described in further detail below) may be used within workflow processes to ensure appropriate notifications are provided, validate that systems which may be affected are not impacted at critical times, ensure dual authorization is provided when appropriate for critical systems and provide an audit trail of what may have been transacted within the system when that action was taken and who requested that action to occur.

In some embodiments, the "Hide" action may be used for a certificate that should no longer be presented to the organization as belonging to them. This may occur when an organization divests or closes a portion of their business, and they would no longer like to be warned on security issues related to that closed or divested business unit. This can be accomplished one certificate at a time, or by modifying the entire collection of certificates to remove all that meet certain criteria (a name, geography, etc.). The "Hide" action may be used sparingly since it removes all security warnings on that certificate. While a user may not want to be warned of an issue, the organization may want that warning. Therefore, to mark something as "hidden" the user may need to be an Administrator and/or may need a second person to validate the "Hide" action before it is effectively recorded as such in the system. The system may alert the second user when their action is required and guide them to the location where they will make the decision on this security violation. Further, the user may be required to add information on why they have made the decision to hide the security violation to ensure a full audit trail is available for future analysis.

The "Ignore" action may be used when a certificate is in violation of corporate policy, yet the organization has evaluated the risk and conscientiously decided that the risk is acceptable. The certificate will show-up in reports and the user interface, but because of the "Ignore" action, it will no longer trigger policy violation warnings in either the user interface or on system generated reports. As noted above, the user may be required to add information into the system describing why they took the action to ignore the warnings and why they are opting to silence future warnings.

The "No Action" option may defer a decision to a later date, or seek additional information prior to making a full decision on the actions that should be taken. This function effectively defers actions on the certificate but allows all alerts to be shown and provided to users. Again, the user may be required to enter information about their decision to take no action at the current time.

The "Reassign" action may allow a user to send a security violation to another user of the system. The other user will then have the ability to take one or more actions to remediate the issue described in the system. Both users may be required to enter a description of why the violation was reassigned and the recipient may be required to enter a description of the actions they will take to remediate the issue The "Urgent Action" option may be used, for example, when the system discovers a certificate that is determined to be fraudulent, stolen, or poses other security threats to the organization. The system may take one or more actions based on a certificate being marked as "Urgent Action." For example, the system may automatically generate a request to the certificate's issuing CA to add the specific certificate to the CA's Certificate Revocation List (CRL). The CRL is the process used within the industry to revoke an already issued certificate. The request may include identifying information associated with the certificate, and supporting information that indicates a reason/basis for why revocation of the certificate is requested. In some embodiments, the system may automatically submit the request to the CA that issued the certificate. In other embodiments, the system may prepare the request and present the request to the user. The user may determine whether to proceed with the request and may initiate submission of the request to the CA through the system. Accordingly, the system may interact with an external system (e.g., the CA's system) to remove bad certificates and ensure they are not accepted as legitimate.

Additionally, or alternatively, when a certificate is marked as "Urgent Action," the system may identify, record, and/or provide additional information that tracks the certificate to the third party organization associated with the certificate (e.g., in anticipation of legal action against the third party organization). The additional information may include: company information on the certificate in question, the issuing CA, hosting providers providing computer services associated with the certificate, one or more issue dates, one or more keys used in generation of the certificate, and/or DNS names associated with the system. Additionally, or alternatively, the system may alert external CAs that the identified certificate has one or more violations (e.g., was fraudulently created or mistakenly issued) and should be revoked. Additionally, or alternatively, the system may look for additional violations (e.g., with other certificates) of a similar form. The system may modify one or more parameters of the search to identify the other certificates. In some embodiments, the system may make recommendations on policy changes within the organization to reduce the risk of further violations.

The "Fix" action may be used where the user determines that action needs to be taken and they note that they are actively working on that security violation. The user may be required to enter some textual information on what actions they will perform to remediate the issue. They may choose to defer further alerts for a time interval up to the maximum time (e.g., as defined by their company system administrator).

Administrators may provide defined actions to be automatically taken upon the discovery of certain security violations. For example, if the system discovers an item in a geographic area defined by the company as dangerous, an automatic workflow may be initiated requiring certain people to take one of the actions previously described. This may initiate as an automated response to the discovery of this data type without any human intervention thereby allowing remediation to begin immediately.

The actions described above may not be mutually exclusive. For example, a user may determine that urgent action needs to be taken, and may assign that decision on what the next corrective action may be to another user, making notes as to why they feel a decision should be made by another individual. Further, all dates, user names, and comments may be written back to the system for a complete audit trail into who performed (or deferred) actions, when the action was taken or deferred, and the user's description of the action that was taken or to be taken.

The system may integrate with other corporate resources such as email, directory services, ticketing systems, or other computing systems to effectively allow users to receive notifications of pending actions, quickly transact those actions and ensure the system is continuously updated.

The embodiments discussed above may include any of a number of suitable variations. Examples of such further embodiments are given below.

1) Data
   a) First, the certificate data may be used in a relatively raw format, meaning that once the certificate has been decoded from the 64-bit encoding, it can be presented to the user in a relatively useful form. While this is a valid approach, it lacks valuable data that is added by the system to provide significantly more value in the attempt to identify secure certificates and those which have vulnerabilities. Further, the server on which a certificate resides may have vulnerabilities which would render a perfectly secure certificate vulnerable. Some of the external data that is added to the raw certificate information may include:
      i) Reverse DNS lookup information
      ii) Geospatial data of the host server
      iii) Configuration data of the host server
      iv) Identification of company names and certificate authorities
      v) Calculation of the certificate validity period (time between when it is able to enter service and when it expires)
      vi) Identification of certificates that identify themselves as being "test", "development" or other verbiage which indicates they may be residing on non-production hardware (increasing vulnerabilities).
   b) Currently rDNS data, Alexa rankings, banner grab data, and geospatial data is added during the processing phase. It could be requested at the time a user issues a query through asynchronous calls to web services (using the Google mapping Application Programming Interface (API), for example, or performing WHOIS look-ups). There are several challenges with this approach, including:
      i) Network overhead would increase significantly at the time a user issued a query. Further, if the system had to wait for the responses from those services prior to rendering a complete web page, the user would see s significant performance decrease.
      ii) If geospatial data were discovered only when a user issued a query, it would be impossible to initiate a query based on geography. For example, it would be difficult for a user to find all certificates that are located in a specific geography. They would have to start with a textual query which would then initiate the web service calls to the mapping software and then the user could refine their query to that geographic region.
      (1) Providing geospatial data look-ups at query time would also present potential erroneous data as an IP address may have been reassigned to another geography between when a certificate is discovered and when the query is executed, thus providing a false geolocation to the user.
      (2) A similar situation would arise for the rDNS data. Instead, that data may be incorporated into the overall data stream to enable rapid response to queries.

2) Data collection
   a) Any suitable tool may be used to perform the internet scan. One example is ZMAP (University of Michigan). Others may include MASSCAN, NMAP, and QUALYS. Regardless of the system chosen to gather the data, the data that is gathered will be the same. A certificate is the same whether it is found by an internet browser as it visits a secure banking website, or whether that data is found en masse via bulk processing with a tool like Nmap or any other flavor of scanning engine.
   b) The system may operate using software tools written in Python to accomplish the decoding of 64-bit certificate data and calculation of date ranges in addition to various UNIX scripts and shell tools to manipulate the data into a usable format. Any other suitable languages may be used to accomplish the same function, but the result would again be the same. Whether it's Python, Perl, Ruby or any other language, a decoded certificate will be the same regardless of the language that decoded it. For this reason, certificates can be used in all environments and on all systems since the encoded and decoded form is platform and language independent.
   c) Data may be collected on any suitable periodic basis (e.g., daily or weekly) or on a continuous basis. Hyper aggressive scanning approaches may lead to network saturation and may yield a greater chance of being banned by organizations and hosts. The delay interval between scans may be changed at any time, so it is an independent variable within the system.

3) Systems
   a) The system may use an architecture in which the data that is collected via the scanning process is temporarily processed in memory—for speed of manipulating the data to the relevant format—before it is inserted into the database. This could just as easily be performed on the file system or completely within the database. However, it may be desirable to reduce the database overhead as some of these manipulations are "expensive" to perform in a database and the file system tends to be slow. While performance for data manipulation is not a limiting factor in the system, the desire to retain performance may suggest storing information to the database when the information is in a "finished" state.
   b) The system may track the "temporal" nature of the database. This enables the system to take into account "time" as one of the factors of the system. This enables the user to "travel back in time" to see the quality and quantity of their certificate environment at a specific time in the past. Further, this feature is enabled to allow for time-based graphing to be presented to the user which will show trending and provide a detailed visual description of how the organization is doing in managing the security of their certificates.
  i) This could be accomplished using a file system approach in conjunction with the search engine that is a component of the overall system. If the decision were made to abandon the database, it could be replaced with a file system storage.
  c) As discussed above, some embodiments utilize a database as a storage mechanism between when the data has been completely manipulated and is in a finished form and when it is indexed by the search engine. The database is simply providing some functionality as described above, but could be replicated by using the file system on the operating system in an effort to minimize the number of components in the system.
  d) The use of a search engine may provide faster response times to user queries than typically achievable exclusively using the database. Any suitable search engine may be used.
  e) The system may run as a hosted solution. In other embodiments, a package may be provided that could be installed on a customer site and run exclusively for one customer.

Various embodiments disclosed herein may operate in a cloud computing environment and may run on commodity hardware in a highly available and redundant environment. The systems and techniques may be offered to customers using Software as a Service (SaaS) as a deployment model.

FIG. 8 depicts some of the information collected about a certificate and/or displayed to a user by the ISAC. Some values have been substituted or truncated to ensure anonymity. As discussed herein the information may include internal information that is found within the digital certificate and external information that is not found in the digital certificate. As shown in FIG. 8, the information may include certificate information (e.g., certificate version, certificate serial number, certificate signature algorithm, certificate subject, company name, company department, reverse DNS name of certificate host, key algorithm, key strength, CA key identifier, certificate key identifier, whether the certificate is identified as a root certificate, domain name, IP address, and/or subject alternative names), certificate authority information (e.g., certificate issuer, issuing CA, and/or identified CA), validity information related to validity periods of the certificate (e.g., date certificate entered service, data certificate expires, dates of certificate validity, and/or total certificate validity period), certificate usage information (e.g., key usage, certificate extended key usage, and/or Netscape legacy certificate type), geospatial location information (e.g., identified certificate location, certificate longitude, and/or certificate latitude), certificate validation information (e.g., certificate curation information, evaluation information, name of curator, title of curator, company name, curation date, a dangerous marker, a validity marker, a white/black list indicator, and/or a geolocation validation indicator to indicate whether the geolocation information has been validated), and/or server configuration information (e.g., server encryption type, cipher type, server compression indicator to indicate whether server compression is enabled, an OCSP stapling indicator, whether a secure certificate was accepted, whether the server supports secure renegotiation, and/or whether the server has a heartbeat enabled).

Some embodiments may include more, less, or different fields than are shown in FIG. 8. For example, other fields which may be collected and/or displayed may include:
  Comments—a field where the person who is curating (evaluating) the certificates can insert some notes about a particular certificate and why they performed various actions.
  Internal tracking of when the certificate was first discovered by the system.
  Internal tracking on the IP addresses and movement of certificates across IP addresses.
  An internal field that breaks apart the IP Address and port (this screen shows them merged to consolidate the fields presented to the user).
  An internal field which combines the domain name and the IP address.
  An internal field containing a unique identifier for each entry in the dataset.

Figure 9:
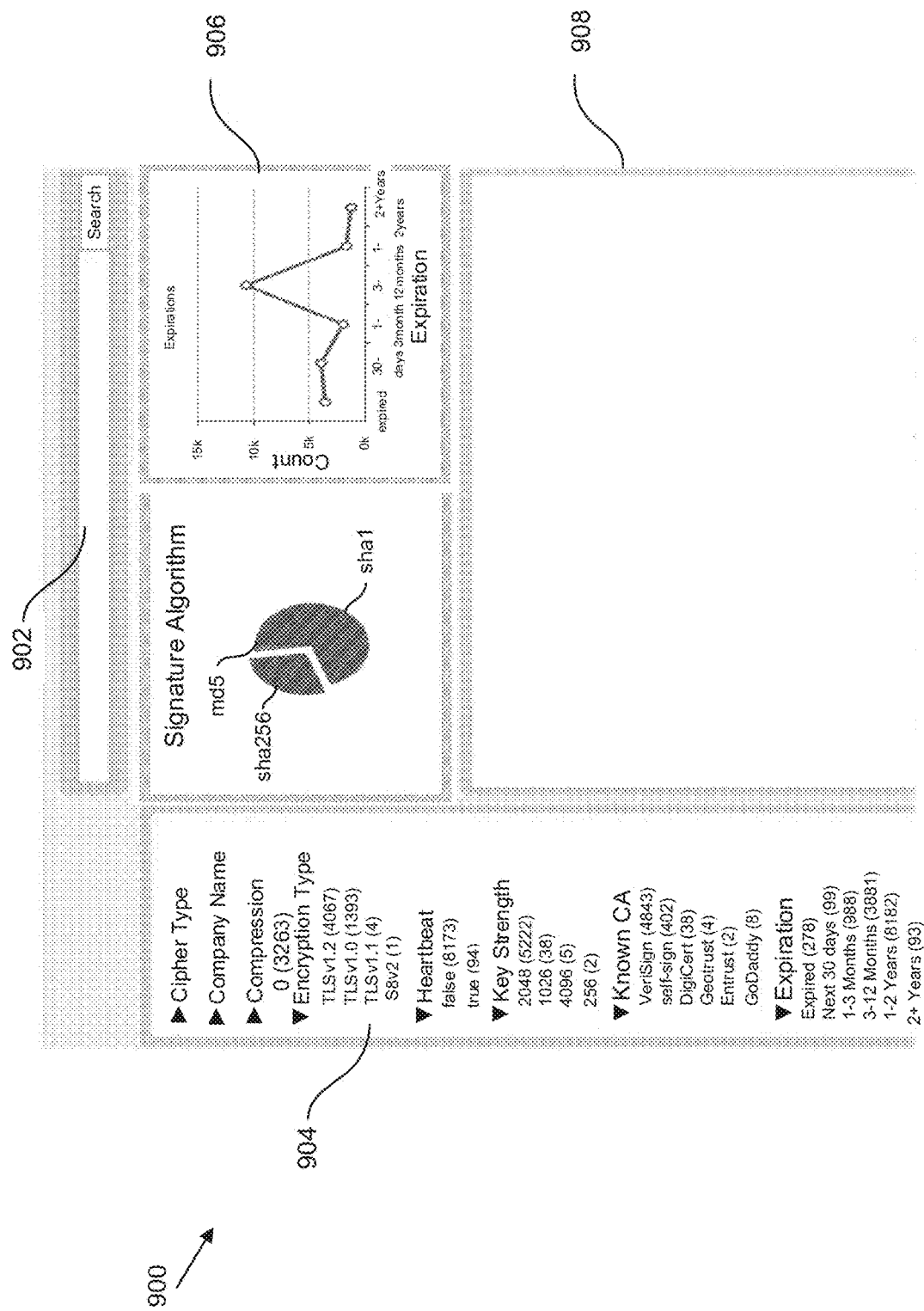
FIG. 9 illustrates an example user interface for the system, in accordance with various embodiments.

FIG. 9 depicts an example interface 900 demonstrating the results from a query. A search box 902 enables the user to insert search parameters to run the query. A navigation bar 904 on the left may enable the user to isolate certain certificates that have vulnerabilities, and the graphs 906 may help guide the user to quick action. A full list of results may be displayed at the bottom in a results pane 908.

Figure 10:
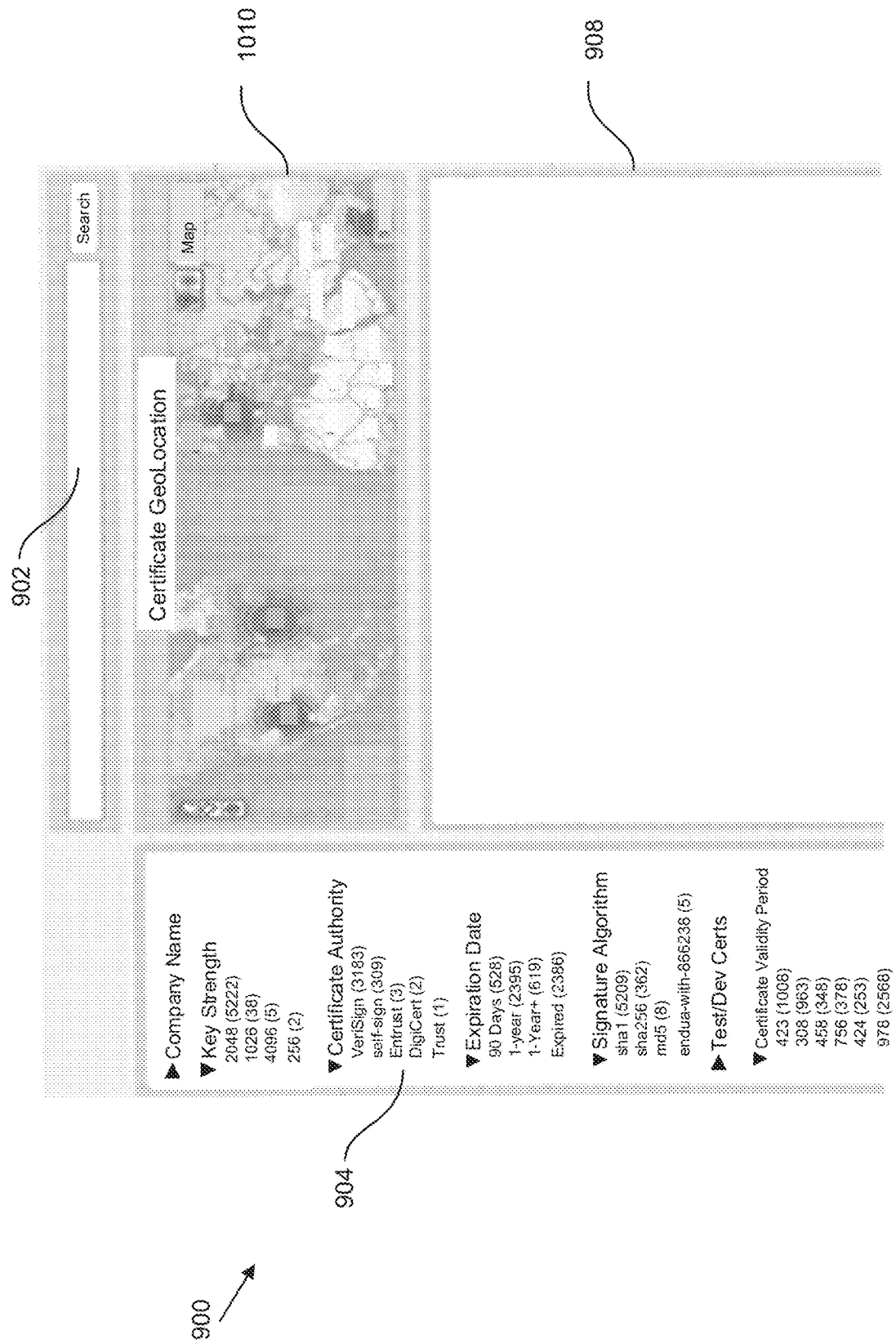
FIG. 10 illustrates an example map view of the interface of FIG. 9, in accordance with various embodiments.

FIG. 10 illustrates an example map view of the interface 900 in accordance with various embodiments. The map view may be selected by the user from the view in FIG. 9. The map view may display a map 1010 to indicate the geographical location of the digital certificates identified by the query (e.g., in place of the graphs 906). The map view may allow the user to look at specific geographical areas that may pose a problem with their certificates.

Figure 11:
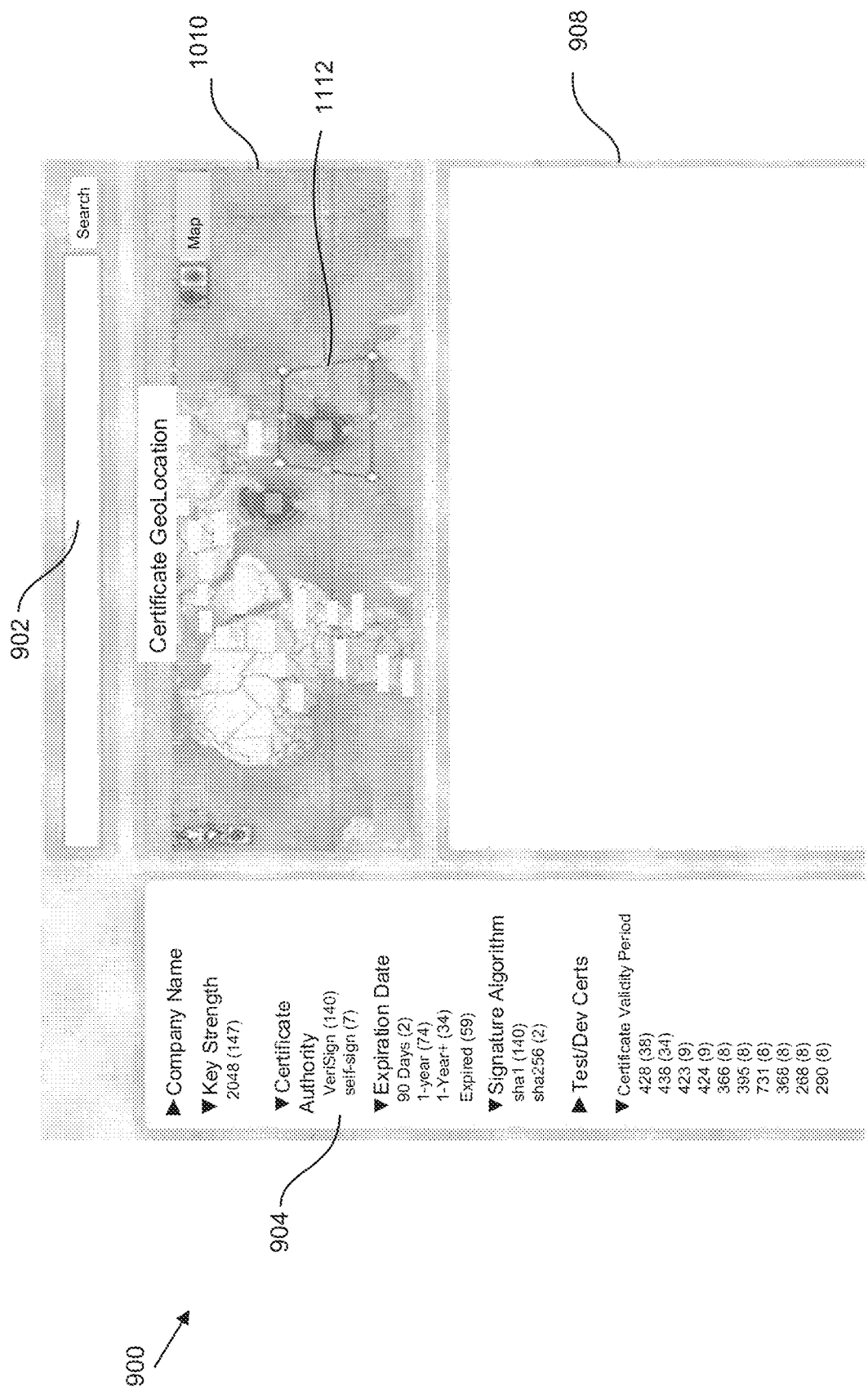
FIG. 11 illustrates another example map view of the interface of FIG. 9, in accordance with various embodiments.

FIG. 11 depicts another example map view of the interface 900 that may be presented to a user to drill down further into a specific area of the world and look at those certificates that are found in a specific region (e.g., Southeast Asia as shown in FIG. 11). The user may draw a boundary 1112 around the region on the map 1010. The result set (e.g., numbers of results denoted in the results pane 908 and the navigation facets on the navigation bar 904) reflect the refinement the user has taken to identify the questionable certificates.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

The invention claimed is:

1. A computer-implemented method comprising:
   identifying a plurality of digital certificates, individual digital certificates of the plurality of digital certificates including respective internal information;
   determining external information associated with the individual digital certificates, the external information including geolocation information associated with a physical location where the digital certificate is stored, wherein the geolocation information includes aggregated data from prior scans with a history of geolocations of an Internet Protocol (IP) address associated with the individual digital certificates;
   running a query against the internal information and the external information of the plurality of digital certificates to identify one or more vulnerable digital certificates associated with a client based on the internal information and the external information; and
   sending a notification to the client regarding the one or more vulnerable digital certificates.

2. The method of claim 1, wherein the running the query is to identify differences in physical locations of different digital certificates among a set of digital certificates associated with the client.

3. The method of claim 2, wherein the running the query is to identify digital certificates of the set of digital certificates that are located outside of a geographical boundary to identify the one or more vulnerable digital certificates.

4. The method of claim 2, further comprising generating a map to indicate the physical location of the set of digital certificates.

5. The method of claim 1, further comprising identifying the one or more vulnerable digital certificates based on one or more differences between the external information of different digital certificates among a set of digital certificates that are associated with the client.

6. The method of claim 1, wherein the external information further includes one or more of:
   a configuration of a host server on which the digital certificate is installed;
   a Domain Name System (DNS) name of the host server;
   reverse DNS data to indicate an owner of the host server;
   an Internet Protocol (IP) address of the host server;
   whether the host server allows compression to be used;
   a length of a validity period of the digital certificate; or
   timing information to indicate a date on which the determining the external information was performed.

7. The method of claim 1, wherein the plurality of digital certificates includes all digital certificates that are accessible via addressable IP address space.

8. The method of claim 1, further comprising generating a removal request to be sent to a certificate authority to request removal of the one or more vulnerable digital certificates.

9. The method of claim 1, wherein the running the query includes identifying one or more digital certificates having an associated company name or domain name that is similar to a respective company name or domain name of the client.

10. The method of claim 1, wherein the internal information includes one or more of:
    a company name associated with the digital certificate;
    a domain name associated with the digital certificate; or
    an expiration date of the digital certificate.

11. The method of claim 1, wherein the one or more vulnerable digital certificates include one or more non-production digital certificates that were not intended to be publicly used.

12. The method of claim 1, further comprising displaying, to a user, the external information associated with a set of digital certificates that are associated with the client.

13. The method of claim 1, wherein the determining the external information includes determining the external information at different points in time, and wherein the running the query includes determining whether the external information has changed between the different points in time.

14. The method of claim 1, wherein the running the query is to identify a plurality of servers or locations where a same digital certificate has been installed.

15. A non-transitory computer-readable media having instructions, stored thereon, that when executed by one or more processors of a computing system cause the computing system to:
    identifying a plurality of digital certificates, individual digital certificates of the plurality of digital certificates including respective internal information;
    determining external information associated with the individual digital certificates, the external information including geolocation information associated with a physical location where the digital certificate is stored, wherein the geolocation information includes aggregated data from prior scans with a history of geolocations of an Internet Protocol (IP) address associated with the individual digital certificates;
    running a query against the internal information and the external information of the plurality of digital certificates to identify one or more vulnerable digital certificates associated with a client based on the internal information and the external information; and
    sending a notification to the client regarding the one or more vulnerable digital certificates.

16. The one or more non-transitory media of claim 15, wherein the instructions, when executed, further cause the system to display a map to indicate the physical location of the digital certificates of the set of digital certificates, or wherein the instructions further cause the system to identify one or more digital certificates of the set of digital certificates that are located outside a predefined geographical boundary.

17. The one or more non-transitory media of claim 15, wherein the external information includes one or more of:
    a configuration of a host server on which one of the plurality of digital certificates is installed;
    a Domain Name System (DNS) name of the host server, reverse DNS data to indicate an owner of the host server;
    an Internet Protocol (IP) address of the host server;
    whether the host server allows compression to be used;
    a length of a validity period of the digital certificate; or
    timing information to indicate a date on which the determining the external information was performed.

18. The one or more non-transitory media of claim 15, wherein the instructions, when executed, further cause the computing system to:
    generate a removal request to be sent to a certificate authority to request removal of the vulnerable digital certificate.

19. The one or more non-transitory media of claim 15, wherein the instructions, when executed, cause the computing system to:

determine the external information for the individual digital certificates at different points in time, determine that the external information for a first digital certificate has changed over time; and indicate to the user that the external information for the first digital certificate has changed over time.

20. A non-transitory computer-readable media having instructions, stored thereon, that when executed by one or more processors of a computing system cause the computing system to:

identifying a plurality of digital certificates, individual digital certificates of the plurality of digital certificates including respective internal information;

determining external information associated with the individual digital certificates, the external information including geolocation information associated with a physical location where the digital certificate is stored, wherein the geolocation information includes aggregated data from prior scans with a history of geolocations of an Internet Protocol (IP) address associated with the individual digital certificates;

update the external information in a database with additional external information collected on a periodic basis;

running a query against the internal information and the external information of the plurality of digital certificates to identify one or more vulnerable digital certificates associated with a client based on the internal information and the external information that has been updated; and sending a notification to the client regarding the one or more vulnerable digital certificates.

* * * * *